Nov. 25, 1941.  A. F. HICKMAN  2,263,578
COMBINED HIGHWAY-RAILROAD FREIGHT VEHICLE
Filed Sept. 26, 1939    5 Sheets-Sheet 1
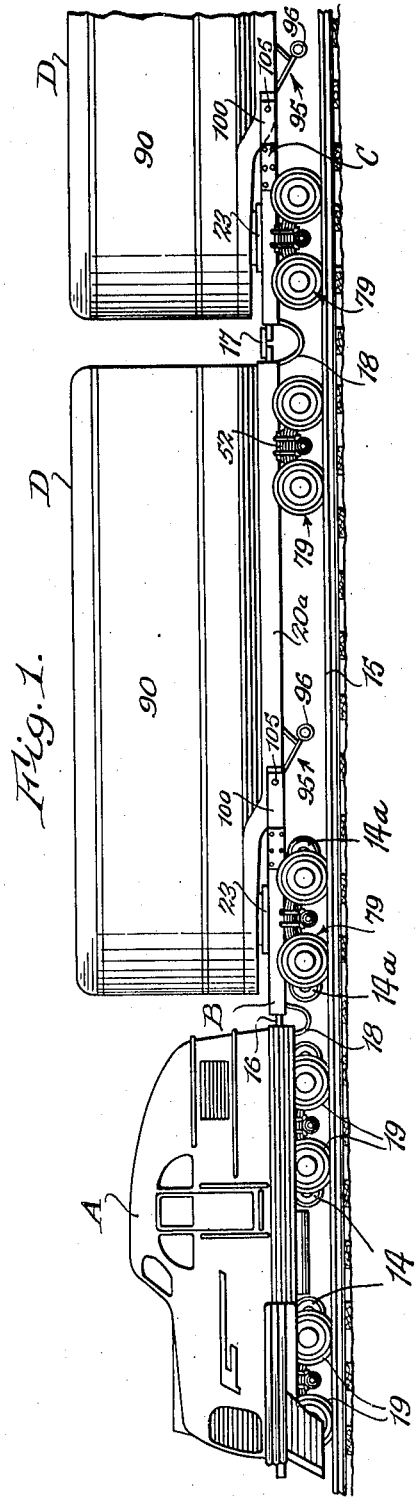
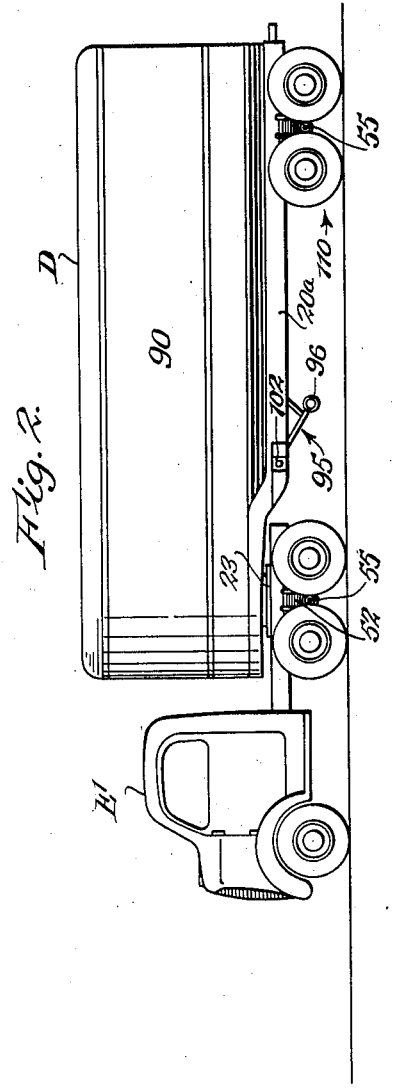
INVENTOR
Albert F. Hickman
BY
Popps and Popps
ATTORNEYS Nov. 25, 1941. A. F. HICKMAN 2,263,578
COMBINED HIGHWAY-RAILROAD FREIGHT VEHICLE
Filed Sept. 26, 1939 5 Sheets-Sheet 2
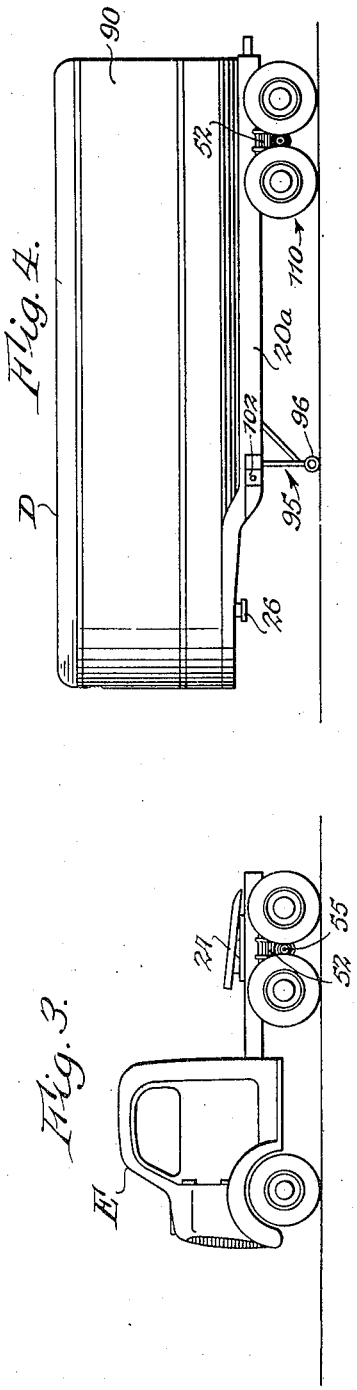
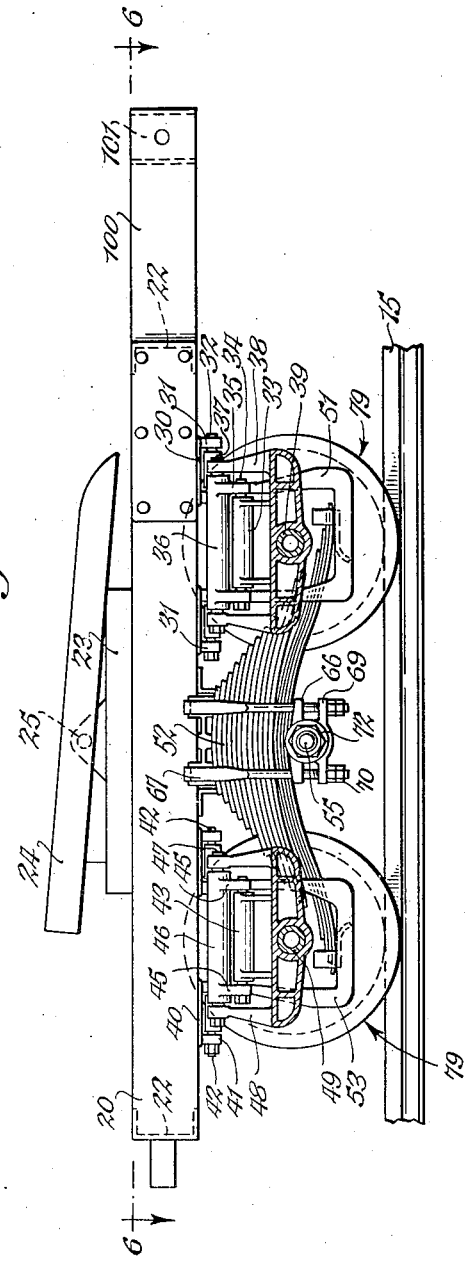
INVENTOR
Albert F. Hickman
BY
Pogoja and Pogoja
ATTORNEYS

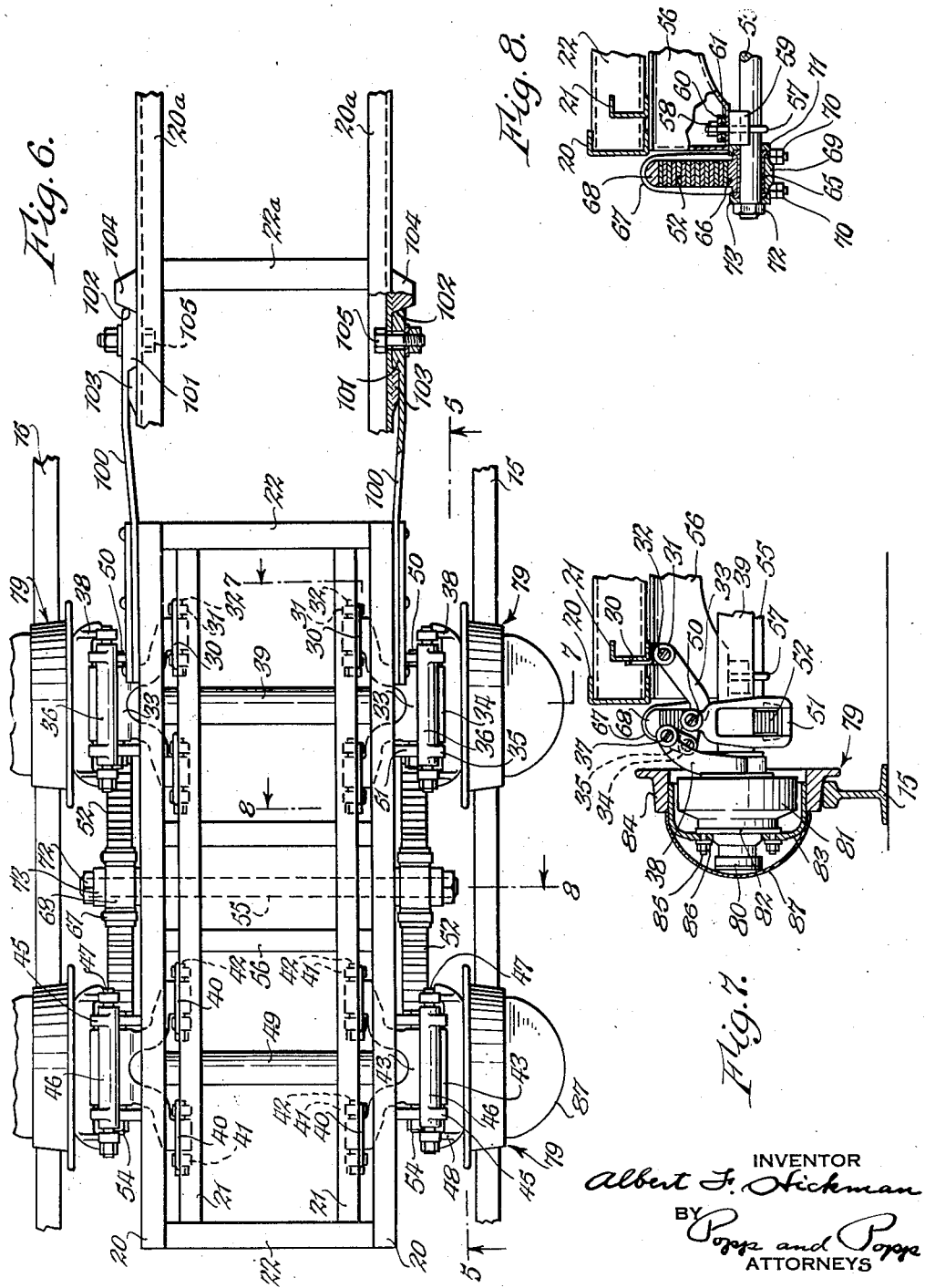

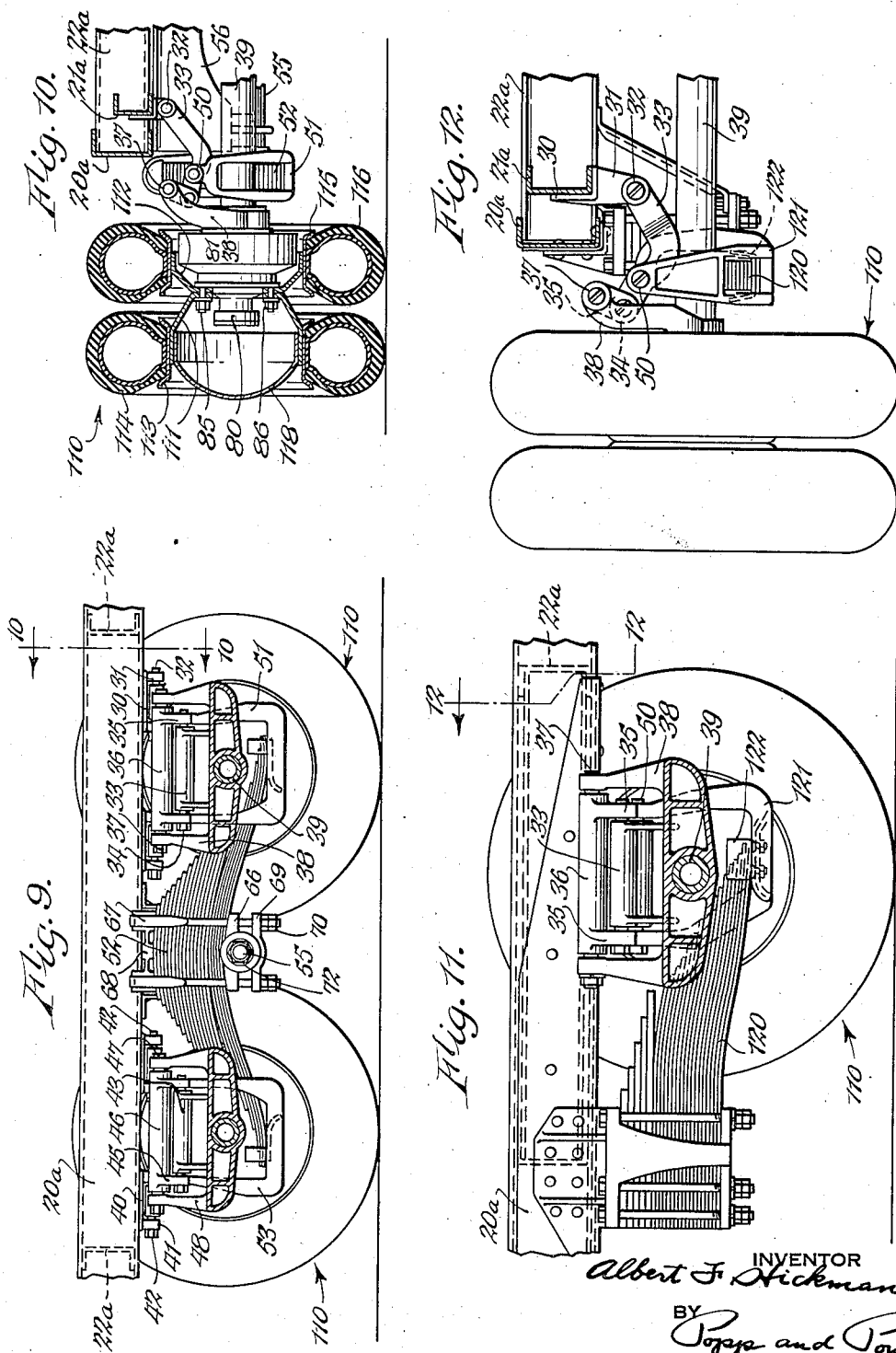

Nov. 25, 1941.  A. F. HICKMAN  2,263,578
COMBINED HIGHWAY-RAILROAD FREIGHT VEHICLE
Filed Sept. 26, 1939   5 Sheets-Sheet 5
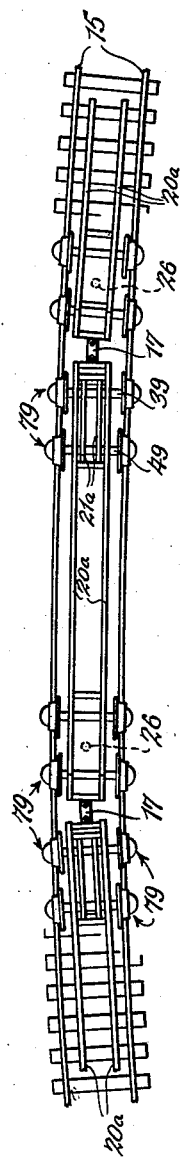
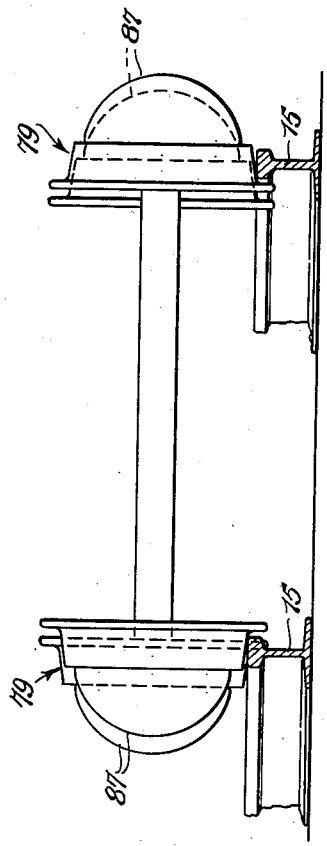
INVENTOR
Albert F. Hickman
BY
Popp and Popp
ATTORNEYS Patented Nov. 25, 1941

2,263,578

UNITED STATES PATENT OFFICE 2,263,578

COMBINED HIGHWAY-RAILROAD FREIGHT VEHICLE

Albert F. Hickman, Eden, N. Y., assignor to Hickman Pneumatic Seat Co. Inc., Eden, N. Y., a corporation of New York Application September 26, 1939, Serial No. 296,653

16 Claims. (Cl. 105—215)

This invention relates to freight vehicles adapted for use both on the public highways as individual units and also in trains on railroad tracks, thereby to secure the inherent advantages of both highway and railroad transportation of freight for substantial distances without the disadvantages inherent to each type of transportation used alone. In general the invention proposes the use of individual semi-trailers to gather loads along highways, these being transported by tractors. These semi-trailers are then grouped into trains and converted to rails and hauled over the rails at high speeds to distant points. Again the semi-trailers are reconverted, separated and sent over highways to their final destinations.

This application is a continuation in part of my copending application Ser. No. 131,193, filed March 16, 1937, now Patent No. 2,198,616, dated April 30, 1940, for Vehicle spring suspension.

At present the transportation of heavy loads of freight is either over the railroads or the public highways or a combination of the two; railroad transportation in all cases involving the loading and unloading of the goods onto railroad freight cars and highway transportation involving the necessity of transportation in individual units driven by individual operators. The advent of the railroad provided a more flexible method of transportation in that it provided a system whereby a single power unit could pull a number of loads of freight at a much higher speed than was possible on the existing highways and waterways. This advantage of transportation for long distances by railroads still obtains, together with the additional advantages of greater safety and lower cost of transportation as compared with highway vehicles.

From the inception of the railroad there has been a continuous trend toward larger trains and units and increased standardization. This trend has resulted in a lack of flexibiltiy in operation, low rail speeds, high first cost and lowered economy in operation, these results having prevented the railroads from responding to modern transportation demands and competition. As a result, a large proportion of long distance hauling is being done over the public highways in individual units. The principal cause of this lack of flexibility which places the railroads at a competitive disadvantage is the fact that the goods must generally be brought to the railroad and reloaded into railroad cars and generally must be again reloaded at the station to which the goods are consigned onto highway trucks for delivery to the consignee. The excessive size of freight cars aggravates this disadvantage and further reduces the safe speeds at which freight trains can be run. These disadvantageous results are, however, due wholly to the railroad equipment and methods used, the transportation of a large number of freight cars in trains over rails for substantial distances still being inherently faster, safer and more economical than transportation in individual units on the highways for the same distances.

For short distance hauling for, say, up to 100 miles, individual highway units are obviously more economical. On the other hand, long distance hauling on freight highways is impractical. Freight cannot be hauled in trains along the highways and highway transportation thereby involves the high cost of an individual driver for each car. While the maximum speed attained by highway vehicles at present exceeds safe speeds the average speeds of highway vehicles for long distance hauling is very low due to the continuous accelerations and decelerations required by hills, curves and traffic obstructions, as well as the many complete stops required by traffic lights and the like. Highway mileage is also generally longer than railroad mileage between two distant points and hauling into and out of congested centers on the highways is an extremely slow process. Further, hauling along the highways is highly hazardous as compared with hauling along a railroad right of way and the cost of fuel, tires and maintenance is much higher with highway equipment.

It is therefore the principal object of this invention to provide transportation equipment which can be readily converted for both highway and railroad use, thereby to take advantage of railroad mass transportation, economies, safety and speed and also to take advantage of the individual highway vehicle flexibility conveniences and economies.

Another object is to provide such equipment which will effect a saving of time in transit, thereby to provide additional economies, especially in perishable goods where refrigeration costs and the like are items of importance.

Another object of the invention is to provide such equipment which can be gradually adopted by the railroads as the rolling stock becomes obsolete and which can similarly be adopted by highway truckers as their highway vehicles become obsolete, thereby to avoid costly replacements in either field and also to avoid any competitive disadvantage to either the railroads or the truckers.

Another object is to provide such equipment which includes convertible semi-trailers of such small size as to provide more flexibility and economy in the shipment of goods, particularly in carload lots, along the railroads and also are entirely adapted to highway transportation by the use of conventional highway tractors.

Another object is to provide a spring suspension for such semi-trailers which are entirely adequate for highway transportation and which also permit much higher speeds to be obtained when coupled in trains on the railroad tracks.

Another object is to provide such equipment which is light in weight and in which the weight of the average payload, when the semi-trailers are coupled in trains and to a power unit, exceeds the weight of the equipment as compared with present railroad equipment where the weight of the rolling stock exceeds the average weight of the payload.

Another object of the invention is to provide such semi-trailers in which the front end of each semi-trailer is capable of being coupled to and supported by a highway tractor by a standard lightweight fifth wheel and is similarly capable of being coupled to and supported by a railroad truck, but in which additional quick detachable connections are provided between each semi-trailer and its truck to withstand the increased longitudinal impacts and forces of train operation and to avoid the possibility of the fifth wheels unlocking. It is another object to provide such auxiliary connecting means which are so designed that the longitudinal forces are carried directly and in a straight line through the semi-trailer and truck frames, this reducing the necessity for heavy frames.

Another object of the invention is to provide such auxiliary connection between the railroad truck and the semi-trailer which rigidly couples them together so that the semi-trailer frame and the truck frame are carried over the rails of the railroad as a rigid unit.

Another aim is to provide such semi-trailers which are readily converted for either highway or railroad use and in which such conversion automatically effects a wheel and bearing inspection of the semi-trailers.

Another object of the invention is to provide such equipment which is converted to railability or highway use within a very short time by a pair of mechanics, the conversion operation thereby not substantially interrupting the rapid transit of the goods.

Other objects and advantages will be apparent from the following description, particularly from the examples of operation set forth.

In the accompanying drawings:

Fig. 1 is a side elevation of a railroad train made of units in accordance with my invention and showing a locomotive drawing a power truck and a train of converted semi-trailers, the front ends of the converted semi-trailers being supported on individual trucks.

Fig. 2 is a side elevation of a highway tractor and one of the semi-trailers converted for highway use.

Figs. 3 and 4 are views similar to Fig. 2, but showing the highway tractor and semi-trailer disconnected from each other.

Fig. 5 is an enlarged, vertical, longitudinal section through one of the railroad trucks used in supporting the front end of a semi-trailer and for interconnecting the trailers in the train, this section being taken on line 5—5, Fig. 6.

Fig. 6 is a section taken on line 6—6, Fig. 5 and showing the fifth wheel and its mounting plate removed and showing the manner in which the truck is coupled with the trailer to resist longitudinal impacts and forces by means other than the fifth wheel.

Figs. 7 and 8 are fragmentary, vertical, transverse sections taken on the correspondingly numbered lines of Fig. 6.

Fig. 9 is a view similar to Fig. 5 but showing the suspension and chassis of a semi-trailer and showing the semi-trailer converted for highway use.

Fig. 10 is a fragmentary, vertical, transverse section through a semi-trailer converted for highway use, this section being taken on line 10—10, Fig. 9.

Fig. 11 is a view similar to Fig. 9 and showing a modified form of the invention.

Fig. 12 is a fragmentary, vertical, transverse section taken on line 12—12, Fig. 11.

Fig. 13 is a plan view of a curve of a railroad track and showing, diagrammatically, the manner in which the axles of the semi-trailers and trucks move laterally in passing around such curves.

Fig. 14 is a vertical section through the railroad curve shown in Fig. 13 and also illustrating, diagrammatically, the relative lateral movement of the axles of the trucks and semi-trailers.

The equipment required in handling freight with the combined highway-railroad vehicles forming the subject of the invention, comprises a locomotive A having flanged wheels which ride on the rails 15 of a railroad track; a power truck B coupled to the locomotive A; a plurality of trucks C provided with flanged wheels to ride on the railroad track and which may or may not be power driven; a plurality of semi-trailer cars D, the front end of each of which is detachably mounted on and rigidly connected with and supported by a corresponding truck and the rear end of which is carried on a spring suspension including flanged wheels which can be replaced with rubber tired wheels; and a plurality of standard highway tractors E, each adapted to be coupled to the front end of one of the semi-trailer cars D through the usual fifth wheel. The power truck B is preferably permanently coupled with the locomotive, as indicated at 16, and the rear end of each of the semi-trailer cars D is coupled to the truck C immediately in rear, as indicated at 17. Air pressure and electric power couplings 18 are also provided for the operation of the train brakes and any power trucks C which may be employed.

It is proposed to run trains having from fifteen to twenty semi-trailer cars D, each semi-trailer car weighing not more than seven and one-half tons and built to carry a payload of from fifteen to twenty tons. For such a train a locomotive A weighing fifteen tons would, in combination with the power truck B, be entirely adequate to propel the train at speeds of from 100 to 125 miles per hour, using, for the present, the high speed passenger tracks on roads as now laid out. The locomotive A is preferably of the Diesel electric type and is preferably mounted on two pairs of tandem axles provided with flanged wheels 19 with all four pairs of wheels being driven by electric motors 14. Each of the tandem axle suspensions for the locomotive is preferably constructed similar to the tandem axle suspension for the trucks B and C and the rear end of each trailer car D, as hereinafter described. The locomotive A is permanently coupled, as indicated at 16, to the power truck B. The construction of this power truck B is identical with the construction of the other trucks C which may or may not be power driven by electric motors 14a and hence a description of one will be deemed to apply to all of the trucks.

Each of the trucks B and C comprises a frame including a pair of outer longitudinal beams or bars 20, a pair of inner longitudinal beams or bars 21 and end cross beams 22. This frame carries the mounting plate 23 of a fifth wheel 24, this fifth wheel being pivotally supported, as indicated at 25, and being slotted to receive the king pin 26 of one of the semi-trailer cars D. The fifth wheel and king pin construction is preferably of the usual and well known form now employed in tractor-semi-trailer highway units and hence a detailed description is deemed unnecessary.

The frame of each of the trucks B and C is carried by a tandem axle suspension which is preferably constructed as follows:

To the rear end of each of the inner longitudinal beams 21 of the frame is suitably secured a pair of downwardly projecting brackets 30, the lower part of each of which is formed to provide a pair of knuckles 31. Each pair of knuckles 31 carries a pin 32 which extends longitudinally of the frame and each of these pins is pivotally connected with one arm of a Y-shaped lever 33. The Y-shaped lever 33 extends outwardly beyond the frame of the truck and is pivoted at its outer end, as indicated at 34, to the downwardly projecting arm 35 of a shackle member 36. The arms 35 slope upwardly and inwardly from the pivots 34, as shown in Fig. 7. The upper part of the shackle member 36 is pivotally connected, as indicated at 37, between a pair of axle posts 38 rising from the rear axle 39. This upward and inward inclined arrangement of the shackle arms 35 tends to cause each axle to centralize itself in a direction transverse of the frame and enables the action of gravity to geometrically and resiliently resist any movement of the axle away from its central position. This permits the truck body to travel substantially straight ahead despite a certain amount of lateral movement of the axle. This is what I term "lateral cushioning" of the vehicle frame relative to one or more of the axles in my said copending application.

The front end of each truck frame is similarly supported by a pair of downwardly projecting brackets 40 secured to the front end of each of the inner longitudinal beams 21 and each formed to provide a pair of downwardly projecting knuckles 41 similar to the knuckles 31 of the brackets 30. Each pair of knuckles 41 carries a pin 42 which is pivotally connected with one arm of a Y-shaped lever 43. The outer end of the Y-shaped lever 43 is pivoted to the lower ends of a pair of arms 45 of a shackle member 46. The shackle member is pivotally connected at its upper part, as indicated at 47, between a pair of axle posts 48 connected with a common front axle 49. It will therefore be seen that the front and rear axles are connected with the frame of the truck by a substantially identical mechanism.

A horizontal pin 50 extends longitudinally of the truck through the outer end of each of the pair of Y-shaped levers 33 and on the ends of this pin are hung a pair of upwardly extending arms of a rocking stirrup-shaped link or block 51. The depending part of this rocking link or block is formed to provide a seat for the rear end of a semi-elliptic, laminated or leaf spring 52, at best illustrated in Fig. 5. In order to hold the end of the spring 52 in position, a channel shaped retaining member is preferably mounted on the seat of the stirrup block 51 upon which rests the corresponding end of the spring, as best illustrated in Fig. 5. The front end of each of these laminated springs 52 is seated in a similar rocking stirrup-shaped link or block 53 hung from the ends of a pin 54 secured at the outer end of the Y-shaped lever 43 of the front axle.

The central, thick part of each of the semi-elliptic springs 52 is pivoted to a cross shaft 55 which is arranged horizontally and transversely of the truck frame. To secure the cross shaft 55 to the frame, a central cross beam 56 is secured to the underside of the frame and each end of the cross shaft 55 is secured to this beam by a U-bolt 57. For this purpose the cross beam 56 is in the form of a broad channel having flanges at its upper edges which attach to the undersides of the longitudinal beams 20 and 21 at its opposite ends. This beam is also preferably arched, longitudinally of its length, as best illustrated in Fig. 8. Each U-bolt embraces the corresponding end of the cross shaft 55 and its upwardly extending legs pass through the cross beam 56 and are provided with nuts 58. A block 59 which is formed on its underside to fit the cross shaft 55 is preferably interposed between each of the cross shafts 55 and the corresponding end of the cross beam 56 and a metal strip 60 and a rubber strip 61 are preferably arranged under the nuts 58 of each U-bolt 57, as best illustrated in Fig. 8.

The means shown for pivotally securing each of the semi-elliptic springs 51 to the corresponding end of the cross shaft 55 comprises a bushing 65 surrounding the corresponding end of the cross shaft 55 and held against the underside of a block 66 interposed between the bushing and the central part of the lowermost leaf of the spring 51 by a pair of U-bolts 67. The upper ends of each pair of U-bolts 67 pass around a block 68 on the upper side of the spring 52 and the legs of these U-bolts extend through the opposite ends of a clamping block 69 which engages and holds the underside of the bushing 65. Below the clamping plate 69 the legs of the U-bolt 67 are provided with the usual nuts 70. In order to prevent longitudinal movement of the cross shaft 55, a washer 71 is provided around the cross shaft 55 between the bushing 65 and the block 59 and a nut 72 is provided at each end of the cross shaft 55 which is tightened against a washer 73 engaging the outer end of the corresponding bushing 65, as best shown in Fig. 8.

An important feature of the present invention is to provide demountable flanged wheels, indicated generally at 79, on the various semi-trailer units D so that these wheels can be substituted with rubber tired highway wheels in converting the semi-trailer for highway use. For standardization the trucks B and C are also preferably provided with the same type of demountable flanged wheels, although it will be understood that any type of flanged wheels could be used on the locomotive and trucks since these are intended only for use on the rails 15 in conjunction with the convertible semi-trailers.

Referring to Fig. 7, the numeral 80 represents a wheel hub which is rotatably mounted on the corresponding end of each of the axles of the truck in any suitable manner, but preferably by means of anti-friction roller bearings (not shown). This hub is formed to provide a rotating brake drum 81, this drum cooperating with an internal braking mechanism (not shown) carried by the axle for frictionally braking the rotation of the wheel hub 80. The brakes can be operated in any suitable manner, but preferably by air pressure supplied from the locomotive A through the air line connections 18 between the different units of the train. Inasmuch as any form of brake mechanism or control from the locomotive A can be employed, no specific type of mechanism is illustrated.

The hub 80 is also formed between the hub cap and the brake drum to provide an annular flange 82 and to the outer face of this flange is bolted a pressed steel wheel member 83 of dished form, this dished wheel member having an inwardly extending flange which is press fitted or otherwise secured to the inside of a flanged steel rim 84. To demountably secure the dished wheel member 83 in position, this member is provided with a central opening which permits it to be fitted against the outer face of the flange 82 and this flange is provided with an annular series of stud bolts 85 which register with corresponding openings provided in the wheel member 83 so that the wheel member can be reliably secured in place by tightening nuts 86 on the studs 85. The hub cap and the stud bolts 85 of each wheel are preferably enclosed by a readily removable outer cap 87 which can be fitted over the projecting periphery of the wheel member 83 in any suitable manner. It will be understood that upon removing this outer cap 87, the nuts 86 can be readily removed to permit removal of the entire wheel from the axle.

The semi-trailers D are illustrated as having bodies 90 shown as being of the van or boxcar type with rear access doors (not shown), although it will be understood that any type of body, such as the types now in common use on either railroad cars or highway vehicles, could be employed. For example, the semi-trailers could be in the form of freight cars, tank cars, coal-type cars, refrigerator cars, cattle cars, etc.

The trailer body is supported on a frame which comprises outer longitudinal side beams 20a and inner longitudinal side beams 21a at its rear end, these side beams being connected by suitable cross frame members 22a. At its front end the outer side beams 21a are offset upwardly to permit the body to ride in a horizontal position with its king pin 26 located in the fifth wheel 24, and these outer side beams 20a are shown as being rounded at their front ends to conform to the rounding front end of the bodies 90.

The rear end of each of the semi-trailers D is supported by a tandem axle suspension identical with that carrying each of the trucks B or C, and when used on the railroad tracks the axles of the tandem axle suspension at the rear of each trailer are supported by removable flanged steel wheels identical with those previously described with reference to the trucks B and C. The description of this tandem axle suspension and the demountable flanged steel wheels is therefore not repeated. As the tandem axle suspensions for the locomotive, the trucks, the semi-trailers and the tractors are identical, the same reference numerals have been applied to corresponding parts in the spring suspensions for each of these units.

To support the front end of each semi-trailer when detached from its truck or tractor, or while detaching the semi-trailer, a retractible landing gear, indicated at 95, is provided. This retractible landing gear can be of any usual and well known type such as now used with highway semi-trailers, but is distinctive in that it is provided with broadly flanged wheels 96. These wheels are so arranged as to engage the rails 15 of the railroad track when the semi-trailer is mounted on the track and the flanges on each wheel insure against slipping off of the track. The flanges on these wheels 96 are also preferably sufficiently broad as to provide adequate support for the front end of the trailer on the highway without injury to the highway.

As previously indicated, the king pin and fifth wheel connection between each semi-trailer and its truck is not regarded as adequate for service when the trucks and semi-trailers are coupled into trains and subjected to the high horizontal impacts and forces of train service. In train service the fifth wheels are relied upon wholly to support the vertical load of the front end of the semi-trailer and an independent coupling is provided between each truck and the front end of its semi-trailer, which is not only arranged to carry the longitudinal forces directly and in a straight line through the semi-trailer and truck frames, but also rigidly couples the semi-trailer and its truck together so that the frames of the semi-trailer and truck travel over the railroad as a rigid unit. To this end a pair of spring arms 100 are suitably secured to the exterior of the side beams 20 of the truck frame and extend rearwardly from the truck frame, as best illustrated in Fig. 6. The front end of each of these spring arms is formed to provide an inwardly extending wedge-shaped enlargement 101 which is adapted to fit a vertical slot or pocket 102 formed between a relatively low front rib 103 and a relatively high rib 104 arranged immediately in rear of this front rib. These ribs are suitably formed in the outer side beams 20a of the semi-trailer frame and project outwardly. A hole is provided in each of the wedge-shaped enlargements 101 which registers with a corresponding hole provided in each pocket 102 and it will therefore be seen that the arms 100 can be rigidly secured to the semi-trailer frame by passing bolts 105 through these holes after the wedge-shaped enlargements 101 of the arms 100 have been properly positioned in the pockets 102. It will further be seen that because of the wedge-shaped form of the enlargements 101 and the pockets 102 that these enlargements can readily be fitted into the pockets. Since these pockets are in the form of vertical channels open at their upper and lower ends, it will also be seen that a connection or disconnection of the semi-trailer body from the spring arms 100 can be readily effected through the use of hydraulic jacks which are also used in the conversion of highway wheels to railroad wheels and vice versa. It will be seen that this connection provides a reliable rigid connection between each truck and its semi-trailer in which longitudinal impacts are carried directly and in a straight line from the one frame to the other. This permits of the use of standard highway type fifth wheels on both the tractors and the trucks and at the same time insures against unlocking of the king pins during rail service and provides a rigid connection between each truck and its frame. At the same time each semi-trailer can be readily separated from its truck by removing the bolts 105 and unlocking the king pin 26 from the fifth wheel 24.

The conversion of the semi-trailers from railroad use is effected by jacking up the semi-trailer, removing the flanged steel wheels 79 and substituting dual tired wheels, indicated generally at 110. As best illustrated in Fig. 10, each of these dual wheels comprises a pair of bell-shaped wheel members 111, 112 arranged face to face and secured together so as to provide an annular wheel member which is Y-shaped in cross section. The bell-shaped members 111, 112 are provided with a central opening and around this opening are provided with a series of bolt holes adapted to receive the studs 85 carried by the hub 80 carried by the axles of the semi-trailer. The nuts 86 secure the bell-shaped wheel members 111, 112 to the corresponding hub. The rim of the bell-shaped member 111 is secured to the rim 113 of the outer tire 114 and the rim of the bell-shaped member 112 carries the rim 115 of the inner tire 116. The rims of these dual tires are preferably made removable in any suitable manner. As with the wheels 79 removable outer hub caps 118 are provided to protect the inner wheel assembly. It will be seen that by removing the nuts 86 the entire dual tired wheel 110 can be removed and the flanged wheel 79 substituted so as to convert the wheels of the semi-trailers for service on the railroad track 15.

The tractor E can be of any usual form but preferably has, as previously stated, a tandem axle suspension identical with the tandem axle suspensions for the locomotive, trucks and trailers, as previously described. The tractor carries a fifth wheel identical with the fifth wheel mounted on each truck as previously described and the same reference numerals have therefore been applied. In tractor operation the connection between the tractor and its semi-trailer is exclusively through the king pin 26 and fifth wheel 24, this being entirely adequate inasmuch as each tractor is connected to but one trailer and hence the horizontal thrust imposed upon the king pin is not so great as when the semi-trailers are coupled together in trains of fifteen or more. The connection between the tractor and the semi-trailer follows standard practice as now carried out.

Where the semi-trailer is designed to carry light loads it is unnecessary that it be supported by a pair of tandem axles.

For such uses the trailer can be carried by a single axle to which either flanged or highway wheels can be applied to convert the trailer for high speed railroad or highway use. Such a suspension is illustrated in Figs. 11 and 12. In this modified form of the invention the axle is connected to the frame of the semi-trailer in exactly the same manner as with each tandem axle as previously described, except that a cantilever type spring 120 is employed for supporting each end of the axle and a slightly different type of stirrup-shaped link or block 121 is substituted for the stirrup-shaped link or block 51 shown in the tandem axle arrangement previously described. The cantilever spring 120 can be of any usual and well known type having its thick end rigidly connected to the frame of the semi-trailer and the opposite end of this spring is arranged in a channel-shaped retaining member 122 secured to the seat part of the stirrup-shaped link or block 121 so as to permit elongation of the spring. As with the stirrup-shaped link or block 51 the stirrup-shaped link or block 121 has a pair of upwardly projecting arms which hang upon the ends of the pin 50 carried by the Y-shaped lever 33. Since in all other respects the single axle suspension shown in Figs. 11 and 12 is identical with that provided for each axle of the tandem axle suspension previously described, a detailed description is not repeated and the same reference numerals have been applied to identical parts.

As previously stated, no specific form of brakes have been illustrated, it being proposed to use air brakes of the standard highway design. When operating on the highways where the coefficient of friction between the rubber tires and the road surface is as high as six-tenths of the static weight, standard size highway brakes and air pressures should be used. The air used on the semi-trailers for highway braking is supplied by the tractor as is conventional.

When the semi-trailers are converted and placed on rails, the available coefficient of friction between the steel rails and steel wheels drops to two-tenths of the static load. Due to this drop of friction coefficient, naturally the brakes, being of the larger capacity for highway demand, must be and can be operated with an air pressure low enough to prevent wheel sliding under normal conditions. The result is that the highway brakes will be considerably oversize for rail use. However, in rail operation the rolling resistance is so low that longer brake application must be used to decelerate a train. This longer but lighter application will require larger brakes to insure long life and prevent the brake from overheating. Air for the brake operation in trains will be supplied by the locomotive through the air hose couplings 18. In the use of the equipment previously described, semi-trailers equipped with single or tandem axles carried by the suspensions described, can readily be hauled over highways with fifteen to twenty ton loads and at the same time these suspensions are flexible enough to be converted and operated on railroad tracks in trains. In this conversion it is proposed that the semi-trailers are hauled into a railroad terminal by the highway tractors E and placed on a siding over a power lift. The tractor is then pulled away and two men with power wrenches can remove the rear wheels and rubber tires by removing the outer hub caps 118 of the rubber tired wheels 110 and also the nuts 86 which secure these wheels to the studs 85 carried by the permanent wheel hubs 80 of the axles. The flanged steel wheels 79 are then placed under these studs 85 and the nuts 86 tightened in place. Upon replacing the protective hub cap 87 the conversion of the trailer wheels from rubber tired highway wheels to steel flanged wheels is completed. The men will then push a truck C or a power truck B under the front end of the trailer and let the trailer down to lock its king pin 26 in the fifth wheel 24. While the king pin connection is being so established the wedge-shaped enlargements 101 of the arms 100 projecting rearwardly from each truck slide into the pocket 102 formed by the vertical ribs 103 and 104 at each side at the front end of the trailer frame. The men thereupon pass the bolts 105 through the registering holes in the enlarged wedge-shaped portion 101 of the connecting arms 100 and the truck frame and tighten down the nuts so that a positive direct connection is provided between the longitudinal frame members of each semi-trailer frame and its truck. This insures against the danger of these units separating while operating over the railroads and also provides a connection of the necessary strength and reliability to resist the abnormal impact and longitudinal forces incident to the handling of many semi-trailers in trains by a single locomotive. This changeover should be easily accomplished in fifteen minutes by two men.

It will also be noted that before a semi-trailer can leave the highway and operate on rails, the highway wheels must be removed and replaced by flanged steel wheels. This, while a minor operation, results in an excellent individual axle, wheel and bearing check before the vehicles start out on the rails. If a bearing were faulty it would be noticed by the two men when the wheels are rotated in mounting. This feature provides additional railroad and highway safety.

In the practical handling of the wheels, it would be desirable that each truck reserved at a railroad station carry a set of four flanged steel wheels for application to the tandem axle suspension of a semi-trailer to be hauled. The rubber tired wheels could be left at the stations or transported along with the semi-trailer to its rail destination to facilitate the reconversion of the semi-trailer for highway use. It is probable that most of the rubber tired highway wheels 110 would be left at the various stations for use on incoming vehicles.

After each semi-trailer has been converted for railroad use and secured to its truck, the units are coupled together in trains, this being effected through the couplings 17 between the rear end of each semi-trailer and the next succeeding truck and by mounting the first semi-trailer on the power truck B connected to the locomotive A, the air lines 18 being also attached. So as not to necessitate extremely heavy frames in the trailers and also to keep the trailer trains flexible it will probably be desirable to limit the number of trailers per train to around fifteen to twenty units. The Diesel electric motor A for such a train should weight about fifteen tons and would be capable of propelling the train at speeds in excess of 100 miles per hour. Since the truck C connected to the locomotive is a power truck this truck adds another ten tons or more to the effective locomotive weight, as well as two additional pair of driving wheels. As a result there are a total of twelve drive wheels and twenty-five tons of effective locomotive weight with only a fifteen ton locomotive. Other power trucks can be incorporated in the train. On the basis of a twenty-two and one-half ton per trailer gross load, including the trucks, and fifteen trailers in a train, the total train load would be approximately three hundred thirty-seven and one-half tons gross. This would comprise the locomotive load. With an effective locomotive weight of twenty-five tons, a ratio of thirteen and one-half to one is the established ration between the locomotive and train weights. This is far more favorable than the ratio in present day fast freights, which is approximately twenty to one.

In connection with the equipment illustrated, it is pointed out that the single and tandem axle suspensions are a particularly important feature of the present invention, inasmuch as this type of suspension is peculiarly adapted for high speed railroad transportation and also for normal highway transportation. Thus, each axle of the tandem axle unit is permitted free lateral movement independently of the other axles against the resistance of its tendency to center itself and at the same time is so associated with the vehicle springs as to provide a stable support for the vehicle at high speeds.

When used in the locomotive, trucks and railroad converted semi-trailers, this suspension overcomes the disadvantages of swivel trucks as now employed on freight cars.

Referring to Figs. 13 and 14, it will be seen that in going around curves the independent laterally cushioned movement of the individual axles permits the train to easily negotiate such curves, the individual axles adapting themselves to the different lateral positions required and which in the present freight car is accomplished by swivel trucks. As to advantages of the tandem axle suspension shown in this application over swivel trucks, with swivel trucks the car weight above the center plate is effective through spring deflection at a ratio of approximately one to four, one inch wheel rise resulting in approximately one-quarter inch spring deflection. With the tandem axle assembly as adapted for highway use in allowing the main spring to oscillate about the central cross shaft to produce free axle compensation for accommodating rough highways, the sprung weight of the vehicle is effective through spring deflection in resisting wheel hop at a ratio of approximately one to two, or one inch wheel rise resulting in one-half inch spring deflection. For rail use this improved stability can further be increased by locking the springs against rotation on the central cross shaft when on rails in which case the sprung weight will be effective through spring deflection on the basis of approximately one to one, or one inch wheel rise to approximately one inch spring deflection.

As a result, the arrangement shown has an effective spring center equal to the track in comparison with an effective spring center equal to one-quarter of the track with a conventional swivel truck. The tandem suspension shown thereby resists wheel hop approximately four times as much as the conventional swivel truck suspension. The features of the tandem axle suspension shown, such as independent axle mounting, with allowable independent wheel rotation, plus low unsprung weight, plus effective spring centers equal to the track, plus lateral cushioning, render the suspension shown far superior to present railroad equipment in safety, stability and ride and at the same time avoids swivel truck diving characteristics.

In the tractor and in the semi-trailers converted for highway use, the above features of the axle suspensions shown provide an improved ride over present equipment, particularly in the provision of laterally cushioned axles. For the equipment used for highways it is additionally desirable to adopt the arrangement of pivots shown in my said copending application Ser. No. 131,193, this arrangement providing for automatic steering to produce sufficient axial misalignment to steer the rear axles around ordinary road curves, in and out of traffic, etc. For rail operation either type of pivot mounting for the spring suspensions is satisfactory.

From the foregoing it will be seen that by the use of the suspensions shown it is possible to adapt highway equipment to high speed railroad use by the simple exchange of flanged steel wheels for the rubber tired highway wheels and at the same time permit of high speed railroad transportation. By the use of the trucks shown, the converted semi-trailers can be transported over rails with the maximum of stability and safety, maximum flexibility, maximum economy regarding cost of operation, maintenance and original cost of equipment. At the same time the equipment illustrated can readily be incorporated into present transportation systems as present railroad and highway equipment becomes obsolete, thereby avoiding a high changeover cost.

I claim as my invention:

1. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and frame and means associated with each of said wheels and said spring suspension to permit the substitution of highway wheels, a truck supporting the front end of said frame and having flanged wheels riding on said track, a pair of transversely spaced rigid arms projecting rearwardly from said supporting truck, detachable means for rigidly securing the rear end of each of said arms to the semi-trailer frame, a fifth wheel carried by said supporting truck on its upper side and supporting the front end of said semi-trailer frame, a king pin at the front of said frame and releasably interlocking with said fifth wheel, said king pin being also adapted to be alternately and releasably coupled with the fifth wheel of a highway tractor.

2. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and said frame, means associated with each of said wheels and said spring suspension to permit the substitution of highway wheels, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably connecting the front end of said frame with a highway tractor.

3. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and said frame and means associated with each of said wheels and said spring suspension to permit the substitution of highway wheels, a supporting truck having flanged wheels riding on said track, means for supporting the front end of said frame on said supporting truck, a releasable supporting connection for coupling said front end of said frame to said supporting truck, means for releasably coupling said frame with a supporting truck supporting another semi-trailer at the same time that said first semi-trailer is so supported on said supporting means of said first supporting truck thereby to couple said semi-trailers in trains on said track, and means for alternately and releasably coupling said frame with a highway tractor.

4. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and frame, means associated with each of said wheels and said spring suspension to permit the substitution of highway wheels, a supporting truck having flanged wheels riding on said track and also carrying a fifth wheel on its upper side, means carried by said frame for mounting the front end of said frame on said fifth wheel to be supported thereby, and nonsupporting coupling means adapted to couple said supporting truck with the frame of another semi-trailer at the same time that said frame of said first semi-trailer is so mounted on said supporting truck thereby to permit said semi-trailers to be coupled together in trains on said track, said means for mounting the front end of said frame on said fifth wheel being also adapted to be alternately and releasably coupled with the fifth wheel of a highway tractor.

5. An convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and frame and means associated with each of said wheels and said spring suspension to permit the substitution of highway wheels, a truck supporting the front end of said frame and having flanged wheels riding on said track, an arm rigidly secured to and projecting rearwardly from said supporting truck, means for detachably securing the rear end of said arm to the semi-trailer frame, nonsupporting coupling means adapted to couple said supporting truck with the frame of another semi-trailer at the same time that said arm is so connected with said frame of said first semi-trailer thereby to permit said semi-trailers to be coupled together in trains on said track, and means for alternately and releasably coupling said frame with a highway tractor.

6. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and frame and means associated with each of said wheels and said spring suspension to permit the substitution of highway wheels, a truck supporting the front end of said frame and having flanged wheels riding on said track, a pair of transversely spaced rigid arms projecting rearwardly from said supporting truck, detachable means for rigidly securing the rear end of each of said arms to the semi-trailer frame, nonsupporting coupling means adapted to couple said supporting truck with the frame of another semi-trailer at the same time that said arms are so connected with said frame of said first semi-trailer thereby to permit said semi-trailers to be coupled together in trains on said track, and means for alternately and releasably coupling said frame with a highway tractor.

7. A convertible highway-railroad vehicle of the character described, comprising a semi-trailer including a frame having longitudinal side members, flanged railroad wheels at the rear end of said frame adapted to travel on a railroad track, a spring suspension secured to the rear end of said frame and interposed between said wheels and frame and means associated with each of said wheels and said spring suspension to permit the substitution of highway wheels, a truck supporting the front end of said frame and having longitudinal side members and flanged wheels riding on said track, an arm rigidly connected with and projecting rearwardly from each of said longitudinal side supporting truck members and adapted to embrace said longitudinal side members of said semi-trailer frame, detachable means for rigidly coupling the rear end of each of said arms to said longitudinal side members of said trailer frame, nonsupporting coupling means adapted to couple said supporting truck with the frame of another semi-trailer at the same time that said arms are so connected with said frame of said first semi-trailer thereby to permit said semi-trailers to be coupled together in trains on said track, and means for alternately and releasably coupling said semi-trailer frame with a highway tractor.

8. A convertible highway-railroad vehicle of the character described, comprising a semi-trailer including a frame having longitudinal side members, flanged railroad wheels at the rear end of said frame adapted to travel on a railroad track, a spring suspension secured to the rear end of said frame and interposed between said wheels and frame and means associated with each of said wheels and said spring suspension to permit the substitution of highway wheels, a truck supporting the front end of said frame and having longitudinal side members and flanged wheels riding on said track, an arm rigidly connected with and projecting rearwardly from each of said longitudinal side supporting truck members and adapted to embrace said longitudinal side members of said semi-trailer frame, an inwardly projecting enlargement at the end of each of said arms and received in outwardly opening pockets provided on the longitudinal side members of said trailer frame, removable bolts passing through said enlargements and the longitudinal side members of said semi-trailer frame to provide a rigid connection therebetween, nonsupporting coupling means adapted to couple said supporting truck with the frame of another semi-trailer at the same time that said arms are so connected with said frame of said first semi-trailer thereby to permit said semi-trailers to be coupled together in trains on said track, and means for alternately and releasably coupling said semi-trailer frame with a highway tractor.

9. A convertible highway-railroad vehicle of the character described, comprising a semi-trailer including a frame, flanged railroad wheels at the rear end of said frame adapted to travel on a railroad track, a spring suspension secured to the rear end of said frame and interposed between said wheels and said frame and means associated with each of said wheels and said spring suspension to permit the substitution of highway wheels, a supporting truck having flanged wheels riding on said track, a releasable supporting connection for mounting the front end of said frame on said supporting truck, a retractible landing gear secured to the front end of said frame, said landing gear including a pair of flanged wheels each engageable with one of the rails of said track, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling said frame with a highway tractor.

10. A convertible highway-railroad vehicle of the character described, comprising a plurality of semi-trailers each including a frame, flanged railroad wheels at the rear end of said frame and adapted to travel on the railroad track, a spring suspension secured to the rear end of said frame and interposed between said wheels and said frame and means associated with each of said wheels and said spring suspension to permit the substitution of highway wheels, a supporting truck having flanged railroad wheels riding on said track, a releasable supporting connection for mounting the front end of said frame of one semi-trailer on said supporting truck, nonsupporting coupling means adapted to couple each supporting truck with one end of the frame of another semi-trailer at the same time that said frame of said one semi-trailer is so mounted on said supporting truck thereby to permit said semi-trailers to be coupled together in trains on said track, means for alternately and releasably coupling each semi-trailer frame with a highway tractor, a locomotive connected to the first of said supporting trucks and having flanged wheels adapted to ride on the railroad track, a prime mover on said locomotive and driving the wheels thereof, motors mounted on certain of said supporting trucks and driving the wheels thereof, and means for energizing said motors through power derived from said prime mover.

11. A convertible highway-railroad vehicle of the character described, comprising a plurality of semi-trailers each including a frame, flanged railroad wheels at the rear end of said frame and adapted to travel on the railroad track, a spring suspension secured to the rear end of said frame and interposed between said wheels and said frame and means associated with each of said wheels and said spring suspension to permit the substitution of highway wheels, a supporting truck having flanged railroad wheels riding on said track, a releasable supporting connection for mounting the front end of said frame of one semi-trailer on said supporting truck, nonsupporting coupling means adapted to couple each supporting truck with one end of the frame of another semi-trailer at the same time that said frame of said one semi-trailer is so mounted on said supporting truck thereby to permit said semi-trailers to be coupled together in trains on said track, means for alternately and releasably coupling each semi-trailer frame with a highway tractor, a locomotive connected to the first of said supporting trucks and having flanged wheels adapted to ride on the railroad track, a prime mover on said locomotive and driving the wheels thereof, a motor mounted on said first of said supporting trucks and driving the wheels of said first of said supporting trucks, and means for energizing said motor through power derived from said prime mover.

12. A convertible highway-railroad vehicle of the character described, comprising a semi-trailer including a frame, an axle at the rear end of said frame, flanged railroad wheels at the ends of said axle and adapted to travel on a railroad track, means associated with each of said wheels and said axle to permit the substitution of highway wheels and a spring suspension interposed between said frame and axle and including centering means yieldingly permitting lateral movement of said axle relative to said frame, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling the front end of said frame with a highway tractor.

13. A convertible highway-railroad vehicle of the character described, comprising a semi-trailer including a frame, a pair of tandem axles at the rear end of said frame, flanked railroad wheels at the ends of said axles and adapted to travel on a railroad track, means associated with each of said wheels and said axles to permit the substitution of highway wheels, said wheels being rotatable independently of one another, and a spring suspension interposed between said frame and axles and including centering means yieldingly permitting lateral movement of said axles relative to one another, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling the front end of said frame with a highway tractor.

14. A convertible highway-railroad vehicle of the character described, comprising a semi-trailer including a frame, an axle at the rear end of said frame, flanged railroad wheels at the ends of said axle and adapted to travel on the railroad track, means associated with each of said wheels and said axle to permit the substitution of highway wheels, said wheels being rotatable independently of one another and a spring suspension interposed between said frame and axle and including a pair of levers fulcrumed on said frame and normally extending outwardly therefrom, means movably connecting each end of said axle with the outer part of the corresponding lever and adapted to allow said axle to move relative to said lever in a direction transverse of the vehicle, and resilient means connected with said frame and engaging each of said levers at a point located beyond its fulcrum, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling the front end of said frame with a highway tractor.

15. A convertible highway-railroad vehicle of the character described, comprising a semi-trailer including a frame, a pair of tandem axles at the rear end of said frame, flanged railroad wheels at the ends of said axles and adapted to travel on a railroad track, means associated with each of said wheels and said axles to permit the substitution of highway wheels, said wheels being rotatable independently of one another, and a spring suspension interposed between said frame and axles and including two pairs of levers fulcrumed on said frame and normally extending outwardly therefrom, means movably connecting each end of each of said axles with the outer part of the corresponding lever and adapted to allow said axles to move relative to said lever in a direction transverse of the vehicle, and resilient means connected with said frame and engaging each of said levers at a point located beyond its fulcrum, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling the front end of said frame with a highway tractor.

16. A convertible highway-railroad vehicle of the character described, comprising a semi-trailer including a frame, a pair of tandem axles at the rear end of said frame, flanged railroad wheels at the ends of said axles and adapted to travel on a railroad track, means associated with each of said wheels and said axles to permit the substitution of highway wheels, said wheels being rotatable independently of one another, and a spring suspension interposed between said frame and axles and including two pairs of levers fulcrumed on said frame and normally extending outwardly therefrom, means movably connecting each end of each of said axles with the outer part of the corresponding lever and adapted to allow said axles to move relative to said lever in a direction transverse of the vehicle, a pair of leaf springs each mounted at its center on one side of said frame between said axles, a stirrup-shaped rocking block depending from each of said levers at a point beyond its fulcrum and providing in its lower part a seat for the corresponding end of one of said leaf springs, a supporting truck having flanged wheels riding on said track, a releasable supporting connection for mounting the front end of said frame on said supporting truck, nonsupporting coupling means adapted to couple said supporting truck with the frame of another semi-trailer at the same time that said frame of said first semi-trailer is so mounted on said supporting truck thereby to permit said semi-trailers to be coupled together in trains on said track, and means for alternately and releasably coupling the front end of said frame with a highway tractor.

ALBERT F. HICKMAN.